United States Patent [19]

Hinata et al.

[11] 4,040,833

[45] Aug. 9, 1977

[54] RADIOGRAPHIC PROCESS AND SENSITIVE MATERIAL FOR THE SAME

[75] Inventors: Masanao Hinata; Haruo Takei; Nobuaki Miyasaka; Kenji Takahashi, all of Minami-ashigara, Japan

[73] Assignee: Fuji Photo Film Co., Ltd., Minami-ashigara, Japan

[21] Appl. No.: 672,947

[22] Filed: Apr. 2, 1976

[30] Foreign Application Priority Data

Apr. 3, 1975 Japan .................................. 50-40577

[51] Int. Cl.² ........................ G03C 1/92; G03C 1/14
[52] U.S. Cl. ................................ 96/45.1; 96/82; 96/126
[58] Field of Search .................. 96/126, 82, 45.1

[56] References Cited

U.S. PATENT DOCUMENTS

| | | | |
|---|---|---|---|
| 3,912,933 | 10/1975 | Van Stappen | 96/82 |
| 3,951,666 | 4/1976 | Hinata et al. | 96/126 |
| 3,953,215 | 4/1976 | Hinata et al. | 96/82 |

Primary Examiner—J. Travis Brown
Attorney, Agent, or Firm—Sughrue, Rothwell, Mion, Zinn and Macpeak

[57] ABSTRACT

In a process for forming radiographic images which comprises exposing a photograhic sensitive material comprising a support and at least one silver halide photographic emulsion layer to radiation from a fluorescent intensifying screen to form a latent image and thereafter developing the same, the improvement which comprises the fluorescent intensifying screen having a maximum emission wavelength in the range of about 500 to about 570 nm and a distribution such that at least about 1/2 of the emission energy is at a wavelength of above about 400 nm, and said silver halide photographic emulsion layer contains at least one sensitizing dye represented by formula (I) and at least one sensitizing dye represented by formula (II):

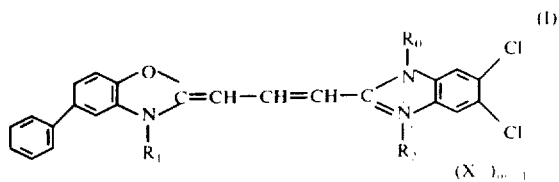

wherein $R_0$ represents an alkyl group and $R_1$ and $R_2$ each represent an alkyl group but at least one of $R_1$ and $R_2$ represents a sulfoalkyl group, X represents an anion, and m represents an integer of 1 or 2, and $m = 1$ when the dye forms an inner salt;

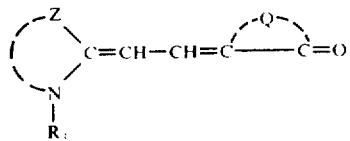

wherein Z represents the group of atoms necessary to complete a benzoxazole nucleus, $R_3$ represents an alkyl group, and Q represents the group of atoms necessary to complete a 2-thioimidazolidine-2,4-dione nucleus.

14 Claims, 2 Drawing Figures

RADIOGRAPHIC PROCESS AND SENSITIVE MATERIAL FOR THE SAME

BACKGROUND OF THE INVENTION

1. Field of the Invention

The present invention relates to a process for obtaining radiographic images using a silver halide photographic sensitive material and to an improvement in photographic sensitive materials for such a process. In more detail, the present invention relates to a process for obtaining radiographic images which comprises exposing a silver halide photographic sensitive material to ionizing radiation while in contact with a fluorescent intensifying screen and carrying out photographic processing, and to silver halide photographic sensitive materials for such a process.

2. Description of the Prior Art

For X-ray recording, usually, an intensifying screen or a fluorescent plate are used together with a silver halide photographic film in order to enhance the X-ray sensitivity. Since excess exposure to X-rays is harmful to the human body, devices which enhance X-ray sensitivity so as to obtain X-ray photographic images at lower X-ray closes are often used. For example it has been attempted not only to increase the sensitivity of silver halide photographic emulsions but also to develop systems using an X-ray image intensifier or systems using a solid state light amplifier. However, in any such case, the X-ray images are finally recorded on gelatino silver halide photograhic material as a fluorescent image.

As fluorescent substances hitherto used for such purposes, there are those which emit blue fluorescent light, such as barium sulfate activated by strontium, barium sulfate activated by lead, barium sulfate activated by silver, calcium tungstate (CaWO$_4$) activated by lead, zinc sulfide activated by silver and barium phosphate (Ba$_3$(PO$_4$)$_2$) activated by europium, etc. For medical treatments, an intensifying fluorescent screen used together with a silver halide radiographic material generally contains calcium tungstate or barium sulfate activated by lead as the fluorescent substance. Recently, studies on fluorescent intensifying screens having a high emission energy intensity have been performed because of increased requirements on X-ray photography for medical treatment. Particularly, it is known from reports of Lockheed Aircraft Corp. that rare earth oxysulfide and oxyhalide fluorescent substances activated by another rare earth element have a high emission energy intensity.

On the other hand, it is preferred that X-ray sensitive materials — direct X-ray sensitive materials and indirect X-ray sensitive materials- be easily processable, for example, at development or fixing. It is particularly preferred to be able to process them in a light room. This type of X-ray photographic material has been processed under a safe light using, for example, a No. 7 safe light filter produced by Fuji Photo Film Co., Ltd.

The spectral transmission curve of the Fuji Photo Film No. 7 Filter is shown in FIG. 1. It is preferred that radiographic silver halide sensitive materials have a high sensitivity to green fluorescent light emitted upon excitation by the above described fluorescent substance but also have a low sensitivity to safe light for ease of processing.

Recently, the processing time for the development-fixing step of sensitive materials composed of silver halide photograhic emulsions has been shortened to 60 seconds to 120 seconds. In such photographic processing, it is difficult to remove sensitizing dyes included in the photographic emulsions from the sensitive material, and, consequently, color from residual dyes is easily caused.

For the spectral sensitization in the green wavelength range, merocyanine dyes, hemicyanine dyes and trinuclear cyanine dyes have often been used. However, such dyes are unsuitable for sensitizing a specific narrow wavelength range because the spectral sensitivity distribution brought about by using them is too broad. Further, it is difficult to obtain a high sensitivity. Such are particularly disadvantageous for the spectral sensitization of high speed silver iodobromide photographic emulsions since the sensitization ratio is low. Further, it is difficult to find supersensitizing agents for such sensitizing dyes. J-agglomeration type cyanine dyes are advantageous used for such purpose, as is well known. For example, there are known techniques of using imidazolocarbocyanine dyes; see U.S. Pat. Nos. 2,701,198, 2,945,763, 2,973,264, 3,173,791, 3,364,031, 3,397,060 and 3,506,443, Japanese Patent Publication No. 4936/1968 and German Patent Applications (OLS) Nos. 1,944,751, 2,011,879, 2,018,687 and 2,030,326; techniques of using imidazooxacarbocyanine dyes; see Japanese Patent Publication No. 14030/1969; and techniques of using pseudocyanine dyes; see German Patent Application (OLS) No. 1,936,262 and French Pat. No. 1,488,057.

Although some of such known cyanine dyes give a high spectral sensitivity, they are not satisfactory because they do not correlate with the spectrum of light emitted from the green fluorescent substance having a high emission sensitivity since the sensitized wavelength is too long and they cause intolerable residual color on the sensitive material after photographic processing.

SUMMARY OF THE INVENTION

One object of the present invention is to provide a process for obtaining radiographic images at high speeds, that is, with a smaller radiation exposure, by using a combination of a radiation fluorescent intensifying screen and a photographic sensitive material.

Another object of the present invention is to provide a process for obtaining radiographic images having less residual color and high maximum image density by using a combination of a radiation fluorescent intensifying screen and a photographic sensitive material.

A futher object of the present invention is to provide silver halide sensitive materials which have a high sensitivity to light emitted from the radiation fluorescent intensifying screen, the maximum emission spectrum of which is in the green spectrum range and which can be handled under a safe light with ease and which yield less residual color after photographic processing.

A futher object of the present invention is to provide silver halide photographic sensitive materials having high green sensitivity which are suitable for rapid development.

The present inventors found that the above objects of the invention can be attained by using a combination of specific sensitizing dyes. Namely, the present invention was reached by incorporating a combination of at least one sensitizing dye represented by formula (I) and at least one sensitizing dye represented by formula (II) in a silver halide photograpic emulsion.

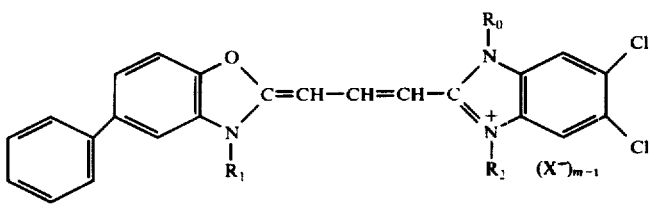

In formula (I), $R_o$ represents an alkyl group (which term includes a substituted alkyl group), preferably a lower alkyl group containing 1 to 4 carbon atoms in the alkyl moiety such as a methyl group, ethyl group, n-propyl group, hydroxyethyl group, acetoxymethyl group or ethoxyethyl group, etc., $R_1$ and $R_2$ each represent an alkyl group (which term includes a substituted alkyl group), preferably having 1 to 8, more preferably 1 to 4, carbon atoms in the alkyl moiety, such as an unsubstituted alkyl group (for example, a methyl group, ethyl group or butyl group etc.), a hydroxyalkyl group (for example, a 2-hydroxyethyl group or 4-hydroxybutyl group, etc.), an acetoxyalkyl group (for example, a 2-acetoxyethyl group or 3-acetoxypropyl group, etc.), a carboxyalkyl group wherein the alkyl moiety preferably has 1 to 4 carbon atoms (for example, a 2-carboxyethyl group, 3-carboxypropyl group or 2-(2-carboxyethoxy) ethyl group, etc.), a sulfoalkyl group wherein the alkyl moiety preferably has 1 to 4 carbon atoms (for example, a 2-sulfoethyl group, 3-sulfopropyl group, 3-sulfobutyl group, 4-sulfobutyl group, 2-hydroxy-3-sulfopropyl group, 2-(3-sulfopropoxy)ethyl group, 2-acetoxy-3-sulfopropyl group, 3-methoxy-2-(3-sulfopropoxy)propyl group, 2-(2-(3-sulfopropoxy)ethoxy)ethyl group or 2-hydroxy-3-(3'-sulfopropoxy)propyl group, etc.) or an aralkyl group, wherein the alkyl moiety preferably has 1 to 4 carbon atoms (for example, a benzyl group or phenylethyl group, etc.), wherein at least one of $R_1$ and $R_2$ represents a sulfoalkyl group, X represents an anion which is conventionally used in cyanine dyes (for example, a chlorine ion, bromine ion, iodine ion, thiocyanate ion, p-toluenesulfonate ion or ethyl sulfate ion, etc.), and $m$ represents an integer of 1 or 2, and $m = 1$ when the dye forms an inner salt.

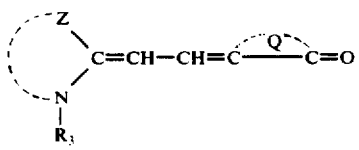

(II)

In formula (II), Z represents a benzoxazole nucleus including substituted benzoxazoles such as a benzoxazole, 5-chlorobenzoxazole, 5-methylbenzoxazole, 5-bromobenzoxazole, 5-fluorobenzoxazole, 5-phenylbenzoxazole, 5-methoxybenzoxazole, 5-trifluoromethylbenzoxazole, 5-hydroxybenzoxazole, 5-carboxybenzoxazole, 6-methylbenzoxazole, 6-chlorobenzoxazole, 6-methoxybenzoxazole, 6-hydroxybenzoxazole, 5,6-dimethylbenzoxazole, 4,6-dimethylbenzoxazole or 5-ethoxybenzoxazole nucleus, etc., $R_3$ represents an alkyl group or a substituted alkyl group which is the same as in $R_1$ or $R_2$, Q represents a 2-thioimidazolidine-2,4-dione (i.e., 2-thiohydantoin) nucleus such as a 2-thiomidazolidine-2,4-dione nucleus, 3-ethyl-2-thioimidazolidine-2,4-dione nucleus, 3-(4-sulfobutyl)-2-thioimidazolidine-2,4-dione nucleus, 3-(2-carboxyethyl)-2-thioimidazolidine-2,4-dione nucleus, 3-phenyl-2-thioimidazolidine-2,4-dione nucleus, 3-α-naphthyl-2-thioimidazolidine-2,4-dione nucleus, 1,3-diethyl-2-thioimidazolidine-2,4-dione nucleus, 1-ethyl-3-phenyl-2-thioimidazolidine-2,4-dione nucleus, 1,3-diphenyl-2-thioimidazolidine-2,4-dione nucleus, 1-(2-carboxyethyl)-3-phenyl-2-thioimidazolidine-2,4-dione nucleus, 1-phenyl-3-ethyl-2-thioimidazolidine-2,4-dione nucleus, 1-(2-hydroxyethyl)-3-phenyl-2-thioimidazolidine-2,4-dione nucleus, 1-(3-hydroxypropyl)-3-phenyl-2-thioimidazolidine-2,4-dione nucleus, 1-(2-carboxyethyl)-3-(p-chlorophenyl)-2-thioimidazolidine-2,4-dione nucleus or 1-ethyl-3-n-butyl-2-thioimidazolidine-2,4-dione nucleus, etc.

DETAILED DESCRIPTION OF PREFERRED EMBODIMENTS

Figure 1:
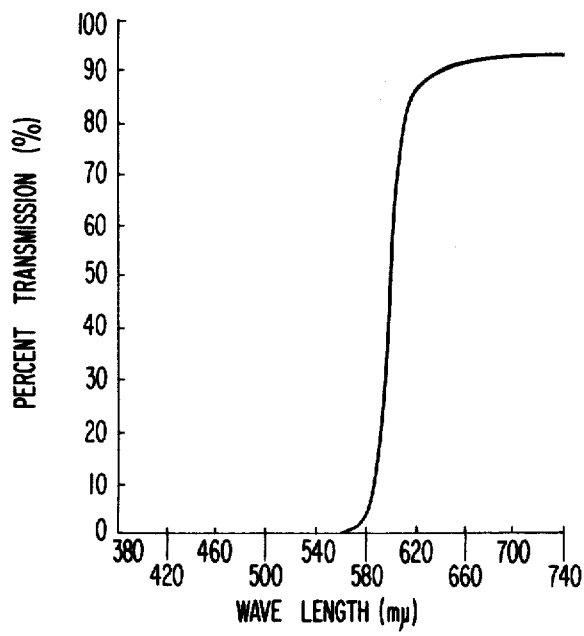
FIG. 1 shows the spectral transmission curve of a safe light filter for obtaining safe light usually used for processing X-ray photographic films.

Fluorescent substances used for the fluorescent screen which emits green light used in the present invention include elements of an atomic number of 39 or from 57 to 71 such as, for example, yttrium, gadolinium, lanthanum, or cerium, etc. Particularly preferred substances are rare earth oxysulfide and oxyhalide fluorescent substances activated by another rare earth element, such as lanthanum or gadolinium oxybromide or oxychloride activated by terbium or dysprosium, or lanthanum or gadolinium oxysulfide activated by terbium, europium or a mixture of terbium and samarium, etc. Such rare earth fluorescent substances are described in German Pat. No. 1,282,819, French Pat. Nos. 1,540,341, 1,580,544 and 2,021,397, Patent of Addition No. 94579 of French Pat. No. 1,473,531, U.S. Pat. Nos. 3,546,128, 3,418,246, 3,418,247, 3,705,858, 3,725,704 and 3,778,615, "Rare Earth Oxysulfide X-ray Phosphors" reported by K.A. Wickersheim in IEEE Nuclear Science Symposium in San Francisco on Oct. 29 - 31 1969, and "IEEE Transactions on Nuclear Science" pages 81 - 83, Feb., 1972, written by R.A. Buchanan. Such are earth fluorescent substances, particularly gadolinium and lanthanum oxysulfide and oxyhalide activated by erbium, terbium and/or dysprosium, have a high X-ray shielding capacity or average absorbing capacity and a high emission density, whereby it becomes possible to use substantially lower X-ray exposure levels.

Specific fluorescent substances which are very suitable for use in the intensifying screens employed in the present invention, and which we cite merely as exemplary, are fluorescent substances having the following general formula:

$M_{(p-q)}M'_qO_pX$ wherein M is at least one of the metals yttrium, lanthanum, gadolinium or lutetium; M' is at least one of the metals dysprosium, erbium, europium, holmium, neodymium, praseodymium, samarium, terbium, thalium or ytterbium; X is sulphur or halogen; q is 0.0002 to 0.02; and p is 1 when X is halogen or 2 when X is sulphur.

It is not only economically advantageous that the amount of silver halide per unit area of the sensitive material be smaller but also the period of time for processing, particularly for fixing, is shortened. However, if the sensitive material having a low silver halide content per unit area is used, the maximum density of the resultant images decreases and the contrast thereof deteriorates. Although a high maximum density can be obtained if an emulsion composed of fine particles is used, it is necessary to carry out exposure to radiation using a large exposure because of the low sensitivity. Accordingly, it is desired to provide an emulsion whereby a sulfficiently high maximum density and high contrast can be obtained even if the amount of silver halide per unit area is small. According to the present invention such a requirement can be satisfied and preferred results are obtained even if the amount of silver is below about 86 mg per square decimeter of the sensitive material, preferably in an amount of from about 20 mg to 86 mg per square decimeter.

One characteristic of the present invention is to spectrally sensitize silver halide photographic emulsions having a low silver content using a combination of benzimidazolo-oxacarbocyanine dyes comprising a 5-phenyl substituted benzoxazole nucleus represented by formula (I) and dimethine-merocyanine dyes comprising a 2-thioimidazolidine-2,4-dione nucleus represented by formula (II), whereby high sensitivity to light emitted by a fluorescent intensifying screen is obtained without deterioration of the maximum density of the emulsion having a low silver content.

Among the sensitizing dyes represented by formula (I), those wherein $R_1$ and $R_2$ both represent a sulfoalkyl group provide particularly high sensitivity.

A combination of benzimidazolo-oxacarbocyanine dyes having a 5-methoxy substituted benzoxazole nucleus and merocyanine dyes represented by the following formulae is known from U.S. Defensive Publication No. T904,026.

Comparison merocyanine dye (1)

(corresponding to Dye F in U.S. Def. Pub. No. T904,026)

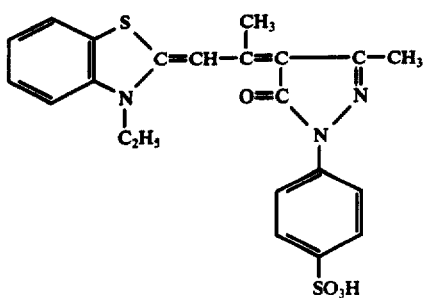

Comparison merocyanine dye (2)

(corresponding to Dye E in U.S. Def. Pub. No. T904,026)

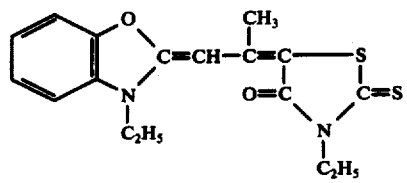

The combination of benzimidazolo-oxacarbocyanine dyes having a 5-phenyl substituted benzoxazole nucleus represented by formula (I) and dimethine-merocyanine dyes having a 2-thiomidazolidine-2,4-dione nucleus represented by formula (II) provides higher sensitivity than the combination described in U.S. Def. Pub. No. T904,026 as shown in Example 1 (Table 1).

The process of this invention provides a particularly high sensitivity to radiation when at least one of gadolinium oxysulfide activated by terbium, yttrium oxysulfide activated by terbium and lanthanum oxysulfide activated by terbium or a mixture of two or more thereof is used as the fluorescent substance of the fluorescent intensifying screen.

Another characteristic of the present invention is that the degree of residual color caused by the sensitizing dyes after processing the photographic element is lowered by using the combination of the sensitizing dyes of the present invention. A combination of dyes represented by formula (I) wherein $R_1$ and $R_2$ both represent a sulfoalkyl group and dyes represented by formula (II) wherein $R_3$ represents a sulfoalkyl group provides a very low degree of residual color.

A further characteristic of the present invention is that the combination of sensitizing dyes of the present invention can be easily handled under a safe light obtained by using a safe light filter which is conventionally used for X-ray photographic materials (for example, Fuji No. 7 Filter produced by Fuji Photo Film Co., Ltd.). The combination of the dyes in U.S. Def. Pub. No. T904,026 provides a rather high sensitivity to a safe light as shown in Example 2 (Table2).

A further characteristic of the present invention is that sufficiently high spectral sensitivity can be obtained even if the silver halide emulsion is composed of large particles, e.g., having an average particle size about from about 0.7 μ to about 2 μ such as is conventionally used for medical radiography. Dyes which have an excellent spectral sensitization function to silver halide emulsions composed of particles having a comparatively small particle size often have a poor spectral sensitization function for emulsions composed of particles having a large particle size (for example, mesoalkyl substituted thiacarbocyanines). The combination of dyes represented by formula (I) and dyes represented by formula (II) used in the present invention results in an excellent spectral sensitivity in the green range for silver halide emulsions composed of particles having a average particle size above about 0.7 μ, and particularly high speed silver halide emulsions composed of particles having an average particle size of about 1.2 μ.

Typical examples of benzimidazolo-oxacarbocyanine dyes represented by formula (I) used in the present invention include the following compounds. However, the sensitizing dyes used in the present invention are not limited to these compounds.
I-1
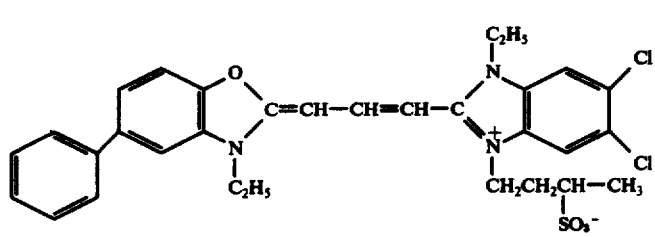
I-2
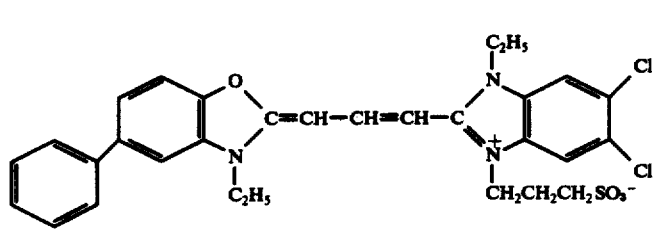
I-3
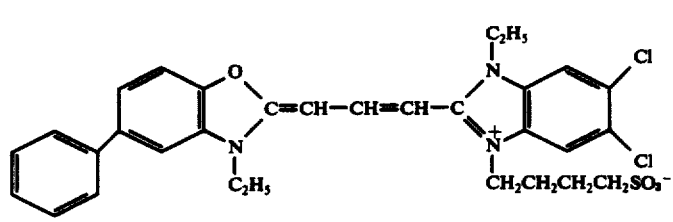
I-4
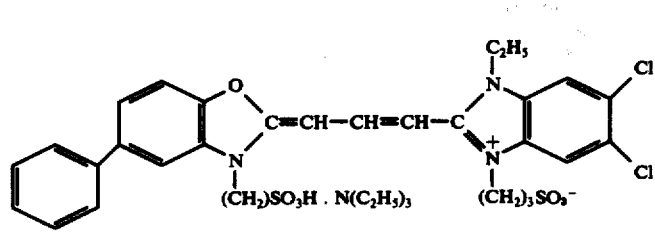
I-5
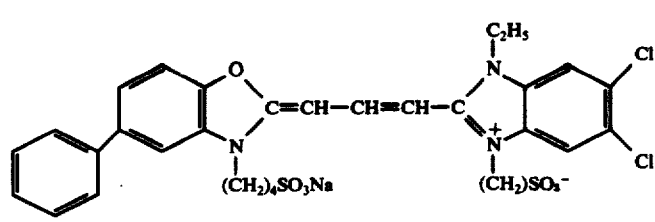
I-6
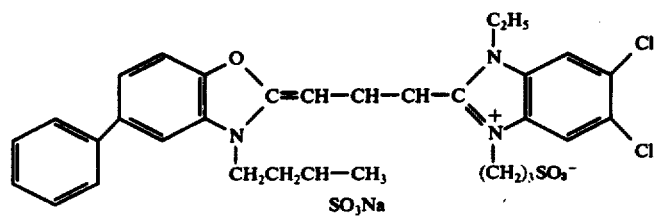
I-7
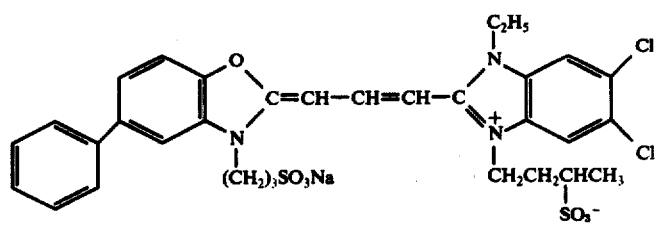
I-8

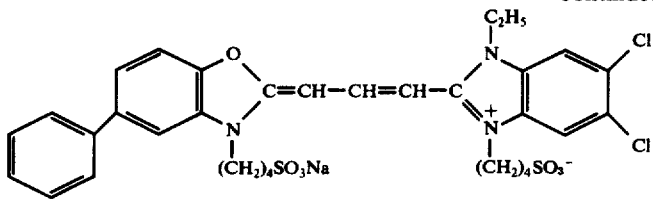
I-9
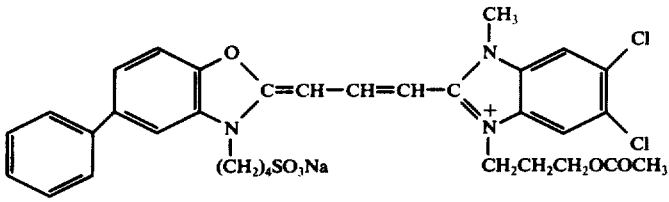
I-10
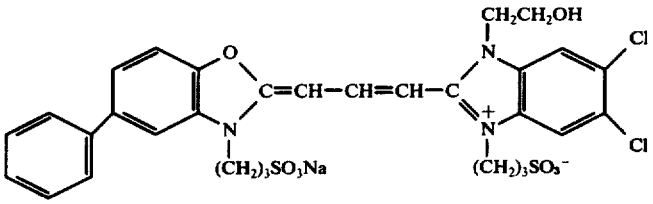
Typical examples of dimethine-merocyanine dyes having a 2-thio-2,4-imidazolidine-dione nucleus represented by formula (II) used in the present invention include the following compounds. However, the sensitizing dyes used in the present invention are not limited to these compounds.
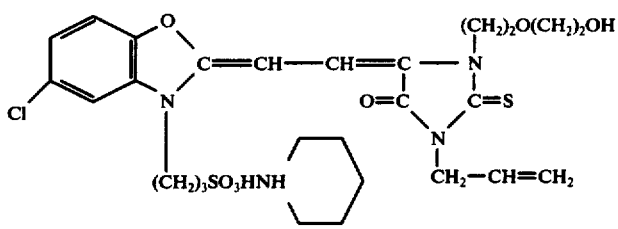
II-1
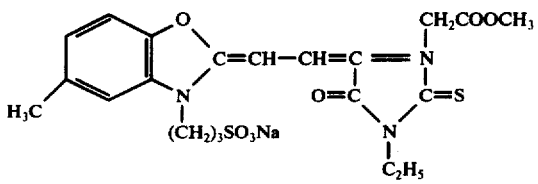
II-2
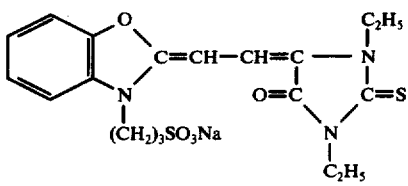
II-3
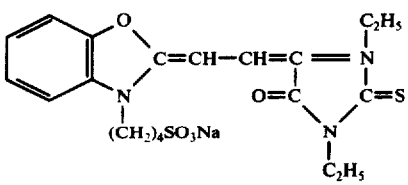
II-4
II-5

-continued

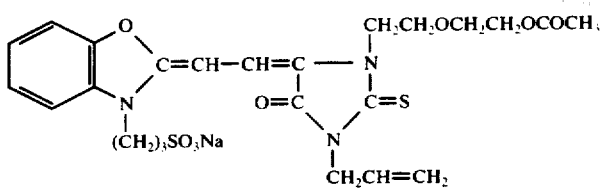

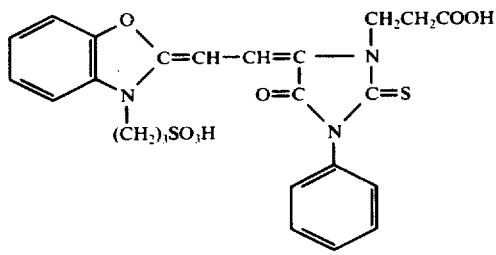

11-6

The dyes represented by formula (I) are sensitizing dyes described, for example, in Japanese Patent Publication No. 14,030/69 and Japanese Patent Application (OPI) No. 33,626/72, and can easily be synthesized by one skilled in the art with reference to the above described patent specifications.

The dyes represented by formula (II) can be easily synthesized by persons skilled in the art with reference to U.S. Pat. Nos. 2,519,001 and 3,822,136, British Pat. No. 1,315,773, Japanese Patent Application (OPI) No. 33817/73, and "The Cyanine Dyes and Related Compounds" page 511, written by F. M. Hamer, Interscience Publishers, New York (1964).

In the present invention, each sensitizing dye can be used in widely varing concentrations. It is preferred to use each dye in an amount of from about $1.0 \times 10^{-5}$ to about $1.0 \times 10^{-3}$ mols of the sensitizing dye per mol of silver halide. It is particularly advantageous to use each dye in an amount of from about $4 \times 10^{-5}$ to about $1.6 \times 10^{-4}$ mols of the sensitizing dye per mol of silver halide. Needless to say, more than one of each dye can be utilized, if desired, in which case the total amount of the dyes of each type falls within the above ranges.

A preferred ratio of the dyes used (molar ratio of the dyes represented by formula (I)/the dyes represented by formula (II) ) is in the range from about 10/1 to about 1/10, most preferably from about 5/1 to about 1/5.

The optimum concentration of the sensitizing dyes in the emulsion can be decided by a conventional method which comprises dividing the emulsion into plural portions, adding the sensitizing dyes to each portion so as to provide different concentrations and determining the sensitivity of each portion.

The addition of the sensitizing dyes to the emulsion can be carried out by methods known in this art, e.g., the sensitizing dyes may be dispersed directly into the emulsion or they may be added to the emulsion as a solution or a dispersion after dissolving as dispersing them in a water miscible solvent such as pyridine, methyl alcohol, ethyl alcohol, methyl cellosolve or acetone (or a mixture of two or more thereof) and sometimes diluting with water or dissolving in only water. Further, ultrasonic vibration can be used for dissolution. In addition, the processes described in Japanese Patent Publications Nos. 8231/70, 23389/69, 27555/69 and 22948/69, German Patent Application (OLS) No. 1,947,935 and U.S. Pat. Nos. 3,485,634, 3,342,605 and 2,912,343, etc., can be used.

It is possible to utilize, if desired, a process which comprises dissolving each sensitizing dye in a suitable solvent, respectively, and adding the resultant solutions to an emulsion or a process which comprises dissolving the sensitizing dyes in identical or different solvents, respectively, and mixing the resultant solutions prior to adding them to the silver halide emulsion.

It is necessary that the sensitizing dyes be uniformly dispersed in the emulsion prior to application to a suitable support such as a glass plate, a film of cellulose derivatives, a film of polyvinyl resins (for example, a polystyrene film or a polyvinyl chloride film, etc.), a polyester film, synthetic paper, baryta paper or polyolefin coated photographic paper, etc. Although addition of the sensitizing dyes to the emulsion may be carried out at any step of production of the emulsion, it is convenient to add them after the conclusion of second ripening.

If desired, the support for the silver halide emulsion layers may be coloured in a conventional manner. Blue dyes are preferred for this purpose. It is advantageous to use a linear condensation polymer for the material of the emulsion layer support, blue coloured polyethylene terephthalate being an example thereof.

Any kind of silver halide, for example, silver chloride, silver bromide, silver iodide, silver bromochloride, silver bromoiodide or silver iodobromochloride, etc., may be used in the present invention. However, silver iodobromide and silver iodobromochloride are advantageously used and silver iodobromide having not more than 3 mol% of silver iodide is particularly preferred. Particles of these silver halides can be formed by known methods, for example, a single jet process, a double jet process or a controlled double jet process.

The particles of silver halide may have any crystal structure, for example, a homogeneous structure, a stratum structure consisting of a core and a shell having different characteristics or a conversion type structure as described in British Pat. No. 635,841 or U.S. Pat. No. 3,622,318. Further, particles wherein a latent image is mainly formed on the surface thereof or inner latent image particles wherein a latent image is formed in the interior thereof may be used. Such photographic emulsions, which are described in "The Theory of the Photographic Process" written by Mees; Published by MacMillan Co., and "Photographic Chemistry" written by Glafkides, published by Fountain Press Co., can be prepared by various processes known by those skilled in the art, such as an ammonia process, a neutral process or an acid process, etc.

It is possible to increase sensitivity without increasing the grain size by washing the silver halide particles with water after the formation thereof to remove by-produced water soluble salts (for example, potassium bromide when silver bromide is produced using silver nitrate and potassium bromide) and then heating in the presence of chemical sensitizers. Sometimes, the silver halide particles may be used without removing the by-produced water soluble salts. These conventional processes are described in the above texts.

The average particle size (for example, the number average value measured by the projected area method) of the silver halide particles used is preferably in a range of from about 0.7 to about 2.0 $\mu$. Particularly excellent effects are obtained in the range of from 1.0 $\mu$ to 2.0 $\mu$.

The silver halide photographic emulsions used can be sensitized by chemical sensitization processes, for example, gold sensitization (see U.S. Pat. Nos. 2,540,085, 2,597,876, 2,597,915 and 2,399,083, etc.); sensitization by metal ions from Group VIII, sulfur sensitization (see U.S. Pat. Nos. 1,574,944, 2,278,947, 2,440,206, 2,410,689, 3,189,458 and 3,415,649, etc.); reduction sensitization (see U.S. Pat. Nos. 2,518,698, 2,419,974 and 2,983,610, etc.) or a combination thereof.

Examples of chemical sensitizers include sulfur sensitizers such as sodium thiosulfate, allyl thiocarbamide, thiourea or cystine; noble metal sensitizers such as potassium chloroaurate, gold (I) thiosulfate or potassium chloropalladate, etc; and reduction sensitizers such as stannous chloride, phenyl hydrazine or reductone, etc.

The emulsions may contain polyoxyethylene derivatives (see British Pat. No. 981,470, Japanese Patent Publication No. 6475/56 or U.S. Pat. No. 2,716,062, etc.), polyoxypropylene derivatives, or quaternary ammonium group containing compounds as sensitizing agents.

The silver halide emulsion layers of the sensitive material may contain suitable antifoggants or stabilizers. Further, they may contain thiazolium salts as described in U.S. Pat. Nos. 2,131,038 and 2,694,716; azaindenes as described in U.S. Pat. Nos. 2,886,437 and 2,444,605; urazols as described in U.S. Pat. No. 3,287,135; sulfocatechols as described in U.S. Pat. No. 3,236,652; oximes as described in British Pat. No. 623,448; mercaptotetrazoles as described in U.S. Pat. Nos. 2,403,927, 3,266,897 and 3,397,987, nitron; nitroindazoles; polyvalent metal salts as described in U.S. Pat. No. 2,839,405; thiouronium salts as described in U.S. Pat. No. 3,220,839; and noble metal salts such as of palladium, platinum or gold, etc., as described in U.S. Pat. Nos. 2,566,263 and 2,597,915.

Typically, a binder is selected, most commonly gelatin, and the binder is generally utilized at a concentration in the range of from about 50 to about 120 grams per mole of silver halide. This range is not, of course, limitative, and can be widely varied as will be appreciated by one skilled in the art.

Further, the silver halide photographic emulsions used in the present invention may contain one or more developing agents (for example, hydroquinones, catechols, acylphenols, 3-pyrazolidones, ascorbic acid or derivatives thereof, reductones or phenylenediamines, etc.). The developing agents may be incorporated in a silver halide emulsion layer and/or in another suitable layer (e.g., gelatin protective layer, yellow filter layer, ultraviololet filter layer) in the photographic element, if desired. The developing agents can be added by dissolving them in a suitable solvent or as a dispersion as described in U.S. Pat. No. 2,592,368 or French Pat. No. 1,505,778.

The silver halide emulsion layers of the sensitive material may be hardened by means of various conventional organic or inorganic hardening agents (for example, formaldehyde, chrome alum, sodium 1-hydroxy-3,5-dichlorotriazine, glyoxal or dichloroacrolein, etc.).

The silver halide emulsion layers of the sensitive material may contain coating assistants such as saponin, alkylarylsulfonates as described in U.S. Pat. No. 2,600,831 or amphoteric compounds, etc., as described in U.S. Pat. No. 3,133,816.

The silver halide photographic emulsion layers of the sensitive material may contain antistatic agents, plasticizers, fluorescent whitening agents, development accelerators, anti-air-fogging agents, toning agents and colored couplers, etc.

Further, dyes as described in Japanese Patent Publications Nos. 20389/66, 3504/68 and 13168/68, U.S. Pat. Nos. 2,697,037, 3,423,207 and 2,865,752, and British Pat. Nos. 1,030,392 and 1,100,546, etc., may be used as antiirradiation dyes.

In the present invention, conventional gelatino silver halide emulsions are used. However, materials which do not have a harmful influence upon sensitive silver halide, such as albumin, agar-agar, gum arabic, alginic acid, hydrophilic resins such as polyvinyl alcohol or polyvinyl pyrrolidone or cellulose derivatives may be used instead of gelatin.

The combination of the dyes in the present invention may be used together with another sensitizing dye or dyes. Particularly, dyes represented by formula (I) and/or dyes represented by formula (II) and methine dyes having a supersensitization function (for example, monomethinecyanine dyes, carbocyanine dyes or apomerocyanine dyes) are advantageously used.

The silver halide light sensitive material for radiography can be placed between separate green-emitting intensifying screens by the user prior to exposure to X-rays or other radiation activating the intensifying screens.

In the present invention, the silver halide sensitive material is developed after exposure to radiation. In medical X-ray photography, it is desired to carry out a rapid processing in order to obtain a radiograph as fast as possible. In such case, a high development activity is necessary for carrying out the rapid development. This is attained by using a developing agent having a high activity or a combination thereof with a developing agent having a super-accelerating function and alkalizing the developing solution so as to have a suitable pH (for example, pH of 9 to 12).

The developing solution may contain conventional additives such as a sulfite, hydroxylamine or derivative thereof, hardening agents, antifogging agents (for example, benzotriazole, 5-nitrobenzoimidazole or 5-nitroindazole), halides such as potassium bromide, solvents for silver halide, toning agents, dimethylformamide, dimethylacetamide or N-methylpyrrolidone, etc.

It is also possible to obtain monochromatic radiographic dye images by a color development process as described in Japanese Patent Application (OPI) No. 55730/73. On the other hand, it is possible to carry out a reversal color processing as described in Japanese Patent Publication No. 23310/65 which comprises carrying out a first black-white development using a developing agent such as Metol or hydroquinone and then carrying out dye image formation. In the above described processing, it is possible to form a dye image a silver image by not bleaching the silver image.

In the following, the present invention will be illustrated by several examples. However, the present invention is not limited thereto.

EXAMPLE 1

A photographic emulsion composed of silver iodobromide having a 1.3 μ average particle size (number average by project area; hereafter the same) (AgI: 1.2 mol%; gelatin (g)/AgNO$_3$ (g)=0.4; 0.75 mols of silver salt/kg of emulsion) was prepared. 5-Methyl-7-hydroxy-S-triazolo[1,5-a]pyrimidine was added as a stabilizer in the amount of 500 mg per kg of the emulsion. To this silver halide emulsion, sensitizing dyes were added as shown in Table 1.

Dyes (3) and (4) used for comparison were imidazolooxacarbocyanine dyes having the following formulae, which correspond to Dyes A and B described in the said U.S. Def. Pub. No. (T904,026).

Dye (3)

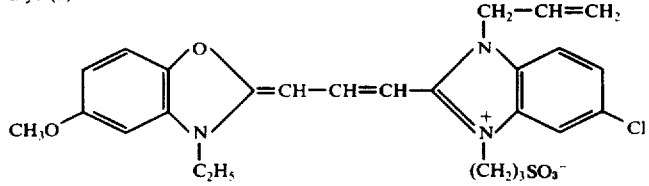

Dye (4)

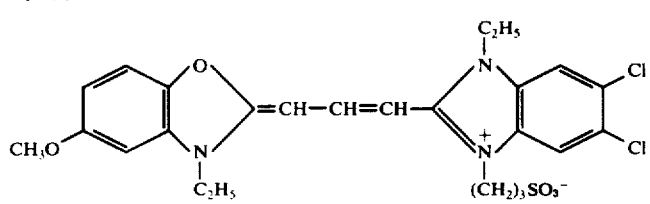

Figure 2:
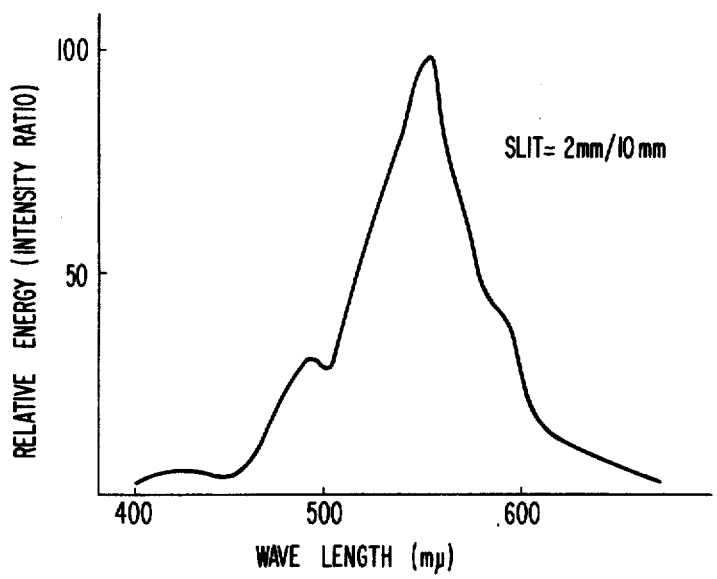
FIG. 2 shows the distribution of emission spectral energy emitted upon excitation with X-rays from fluorescent gadolinium oxysulfide fluorescent paper activated by terbium used for X-ray photography.

The resultant emulsion was applied to both faces of a blue tinted polyethylene terephthalate support having subbing layers so as to form silver halide emulsion layers containing silver halide in an amount corresponding to 3.8 g of silver per square meter. A gelatin protective layer was provided in a coating amount of 1 g per square meter on each emulsion layer. The coated film was then exposed to a X-rays as follows. The coated film was placed between two intensifying screens composed of gadolinium oxysulfide (Gd$_2$O$_2$S) activated by terbium having the emission spectrum shown in FIG. 2. After inserting an optical wedge between the film and the intensifying screen, the film was exposed to X-rays (dose: 25 milliroentgens).

After expsure, the photographic element was developed according to the following steps by means of a conveying roller automatic processor.

| | Processing Temperature | Processing Time |
|---|---|---|
| Development | 35° C | 25 seconds |
| Fixing | 34° C | 25 seconds |
| Water wash | 33° C | 25 seconds |
| Drying | 45° C | 15 seconds |

The compositions of the developing solution and the fixing solution were as follows.

| Developing Solution | |
|---|---|
| Water | 500 ml |
| Hydroxyethylenediamine triacetic acid | 0.8 g |
| Sodium sulfite (anhydrous) | 50.0 g |
| Potassium hydroxide | 20.0 g |
| Hydroquinone | 25.0 g |
| 1-Phenyl-3-pyrazolidone | 1.5 g |
| Boric acid | 10.0 g |
| Triethylene glycol | 25.0 g |
| Glutaraldehyde | 5.0 g |
| Glacial acetic acid | 3.0 g |
| Sodium bisulfite (anhydrous) | 4.5 g |
| 5-Nitroindazole | 0.03 g |
| 1-Phenyl-5-mercaptotetrazole | 0.005 g |
| 5-Methylbenzotriazole | 0.005 g |
| Water to make | 1.0 liter |

(This developer had a pH of about 10.30 at 20° C)

| Fixing Solution | |
|---|---|
| Water | 500 ml |
| Ammonium thiosulfate | 180 g |
| Sodium thiosulfate (pentahydrate) | 45 g |
| Sodium sulfite (anhydrous) | 18 g |
| Boric acid | 7.5 g |
| Aluminum chloride (hexahydrate) | 20.0 g |
| Nitrilotriacetic acid | 0.3 g |
| Tartaric acid | 3.5 g |
| Glacial acetic acid | 18.0 g |
| Sulfuric acid (conc) | 1.2 g |
| Water to make | 1.0 liter |

(This fixing solution had a pH of about 4.20 at 20° C)

In Table 1, the relative sensitivity (the relative value of the inverse number of the exposure required to produce a density of 0.5 above the fog level) and the fog density (not including the density of the support) of each sample are shown.

Table 1

| No. | Sensitizing Dye* and Amount Thereof × 10$^{-5}$ mols/kg of emulsion | | | | Relative Sensitivity | Fog |
|---|---|---|---|---|---|---|
| | Dye | Amount | Dye | Amount | | |
| 1 | (1 - 1) | 6 | (II - 5) | 2 | 96 | 0.03 |
| | | 6 | | 4 | 100 | 0.03 |
| | | 8 | | 4 | 104 | 0.04 |
| 2 | (I - 5) | 6 | (II - 4) | 2 | 114 | 0.03 |
| | | 6 | | 4 | 123 | 0.03 |
| | | 8 | | 4 | 123 | 0.03 |
| 3 | (I - 5) | 6 | (II - 3) | 2 | 110 | 0.03 |
| | | 6 | | 4 | 123 | 0.03 |
| | | 8 | | 4 | 118 | 0.03 |
| 4 | (I - 9) | 6 | (II - 1) | 2 | 104 | 0.03 |
| | | 6 | | 4 | 104 | 0.03 |
| 5 | Comparison Dye(3) | 8 | Comparison Dye(1) | 4 | 110 | 0.03 |
| | | 6 | | 2 | 62 | 0.03 |
| | | 6 | | 4 | 62 | 0.04 |
| 6 | Comparison parison | 8 | Comparison parison | 4 | 80 | 0.05 |
| | | 6 | | 2 | 80 | 0.05 |

Table 1-continued

| No. | Sensitizing Dye* and Amount Thereof × $10^{-5}$ mols/kg of emulsion | | | | Relative Sensitivity | Fog |
|---|---|---|---|---|---|---|
| | Dye(4) | Amount | Dye(2) | Amount | | |
| | | 6 | | 4 | 85 | 0.06 |
| | | 8 | | 4 | 85 | 0.12 |

*as earlier identified

It is clear from Table 1 that the combination of dyes of the present invention provides a high sensitivity to the emission of the fluorescent intensifying screen. Particularly, it is clear that the sensitivity is higher than that obtained using the combination of dyes described in U.S. Def. Pub. No. T904,026.

EXAMPLE 2

A photographic emulsion composed of silver iodobromide particles having a 1.5 μ average particle size (AgI: 1.4 mol% gelatin (g)AgNO₃(g)=0.5, 0.8 mols of silver salt/kg of emulsion) was prepared. 5-Methyl-7-hydroxy-S-triazolo[1,5-a]pyrimidine was added as a stabilizer in an amount of 500 mg per kg of the emulsion. To this silver halide emulsion, sensitizing dyes were added as shown in Table 2. The resultant emulsion was applied to both faces of a blue tinted polyethylene terephthalate support as in Example 1 having subbing layers on each side so as to form silver halide emulsion layers having a silver halide in an amount corresponding to 3.5 g of silver per square meter. A gelatin protective layer was provided in a coating amount of 1 g per square meter on each emulsion layer.

In order to examine ease of handling under a safe light, the sample was exposed to a safe light for 1 minute at a 1.5 m distance using a combination of a 5 W tungsten lamp and a Fuji No. 7 Safe Light Filter (produced by Fuji Photo Film Co., Ltd.). After developing, etc., in the same manner as in Example 1, the density of the sample was determined using a P-type densitometer produced by Fuji Photo Film Co., Ltd. The resultant density is shown in Table 2 as the safe light fog. Further, a nonexposed sample was subjected to development, etc., in the same manner and the resultant density determined. The resultant density (not including the density of the support) of each sample is shown in Table 2 as residual color.

Table 2

| No. | Sensitizing Dye* and Amount thereof × $10^{-5}$ mols/kg of emulsion | | | | Safe Light Fog | Residual Color |
|---|---|---|---|---|---|---|
| | Dye | Amount | Dye | Amount | | |
| 1 | - | | | — | 0.03 | 0.03 |
| 2 | (I - 4) | 4 | (II - 4) | 2 | 0.03 | 0.03 |
| | | 4 | | 4 | 0.03 | 0.03 |
| | | 8 | | 4 | 0.03 | 0.03 |
| | | 8 | | 8 | 0.03 | 0.03 |
| 3 | (I - 5) | 4 | (II - 3) | 2 | 0.03 | 0.03 |
| | | 4 | | 4 | 0.03 | 0.03 |
| | | 8 | | 4 | 0.03 | 0.03 |
| | | 8 | | 8 | 0.03 | 0.03 |
| 4 | (I - 1) | 6 | (II - 5) | 4 | 0.03 | 0.05 |
| | | 8 | | 4 | 0.03 | 0.06 |
| 5** | Dye (3) | 4 | Dye (1) | 2 | 0.11 | 0.03 |
| | | 4 | | 4 | 0.14 | 0.03 |
| | | 8 | | 4 | 0.18 | 0.03 |
| | | 8 | | 8 | 0.26 | 0.03 |
| 6** | Dye (4) | 4 | Dye (2) | 2 | 0.21 | 0.03 |
| | | 4 | | 4 | 0.24 | 0.05 |
| | | 8 | | 4 | 0.36 | 0.10 |
| | | 8 | | 8 | 0.44 | 0.13 |

* As earlier identified
** No. 5 and 6 are for comparison.

It is clear from Table 2 that the sensitive materials using the combination of dyes of the present invention are easy to handle under a safe light while the sensitive materials using the combination of dyes described in U.S. Def. Pub. No. T904,026 are fogged by a safe light. Further, it can be understood that the sensitive materials using the combination of dyes of the present invention have a very low degree of residual color after rapid photographic processing.

While the invention has been described in detail and with reference to specific embodiments thereof, it will be apparent to one skilled in the art that various changes and modifications can be made therein without departing from the spirit and scope thereof.

What is claimed is:

1. In a process for forming radiographic images which comprises exposing a photographic sensitive material comprising a support and at least one silver halide photographic emulsion layer to radiation from a fluorescent intensifying screen to form a latent image and thereafter developing the same, the improvement which comprises the fluorescent intensifying screen having a maximum emission wavelength in the range of about 500 to about 570 nm and a distribution such that at least about ½ of the emission energy is at a wavelength of above about 400 nm, and said silver halide photographic emulsion layer contains at least one sensitizing dye represented by formula (I) and at least one sensitizing dye represented by formula (II):

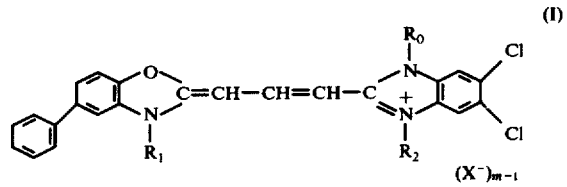

(I)

wherein $R_o$ represents an alkyl group and $R_1$ and $R_2$ each represent an alkyl group, but at least one of $R_1$ and $R_2$ represents a sulfoalkyl group, X represents an anion, and m represents an integer of 1 or 2, and $m = 1$ when the dye forms an inner salt,

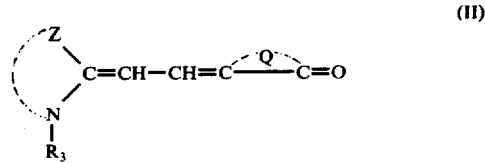

(II)

wherein Z represents the group of atoms necessary to complete a benzoxazole nucleus, $R_3$ represents an alkyl group, and Q represents the group of atoms necessary to complete a 2-thioimidazolidine-2,4-dione nucleus.

2. The process according to claim 1, wherein both $R_1$ and $R_2$ in formula (I) represent a sulfoalkyl group.

3. The process according to claim 1, wherein $R_3$ in formula (II) represents a sulfoalkyl group.

4. The process according to claim 1, wherein said silver halide emulsion comprises silver iodobromide particles having an average particle size of from about 1.0 to about 2.0 μ.

5. The process according to claim 1, wherein $R_1$ and $R_2$ in formula (I) represent a sulfoalkyl group and $R_3$ in formula (II) represents a sulfoalkyl group.

6. The process according to claim 1, wherein both $R_1$ and $R_2$ in formula (I) represent a sulfoalkyl group, $R_3$ in formula (II) represents a sulfoalkyl group and the silver halide emulsion layer comprises a silver iodobromochloride or silver iodobromide emulsion having an average particle size of from about 1.0 to about 2.0 μ.

7. The process according to claim 6, wherein the silver halide emulsion comprises silver iodobromide particles containing not more than about 3.0 mol% iodide.

8. The process according to claim 1, wherein said fluorscent intensifying screen comprises gadolinium oxysulfide activated by terbium, yttrium oxysulfide activated by terbium, lanthanum oxysulfide activated by terbium or a mixture of two or more thereof.

9. The process according to claim 1, wherein a pair of said intensifying screens are utilized and said radiographic sensitive material is interposed therebetween at the time of exposure.

10. A process according to claim 1, wherein a total of from about $1.0 \times 10^{-5}$ to about $1.0 \times 10^{-3}$ moles of one or more sensitizing dyes of general formula (I) is used in combination with from about $1.0 \times 10^{-5}$ to about $1.0 \times 10^{-3}$ moles of one or more sensitizing dyes of general formula (II), both based per mole of silver halide.

11. A process according to claim 10, wherein the molar ratio of the one or more dyes represented by formula (I)/one or more dyes represented by formula (II) is in the range of from about 10/1 to about 1/10.

12. A photographic sensitive material comprising a support and at least one silver halide photographic emulsion layer wherein said silver halide photographic emulsion layer contains at least one sensitizing dye represented by formula (I) and at least one sensitizing dye represented by formula (II):

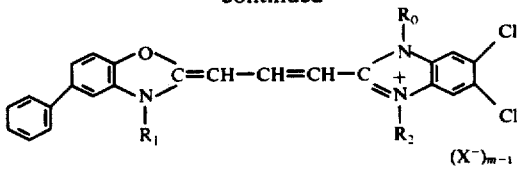

(I)

-continued

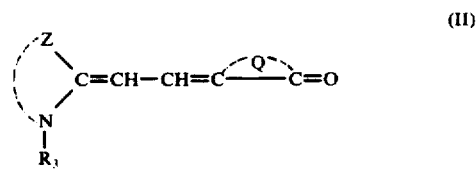

wherein $R_o$ represents an alkyl group and $R_1$ and $R_2$ each represent an alkyl group but at least one of $R_1$ and $R_2$ represents a sulfoalkyl group, X represents an anion, and m represents an integer of 1 or 2, and $m = 1$ when the dye forms an inner salt:

$$\begin{array}{c} Z \\ \diagup \\ \diagdown \\ N \\ | \\ R_3 \end{array} C=CH-CH=C \overset{Q}{\frown} C=O$$

(II)

wherein Z represents the group of atoms necessary to complete a benzoxazole nucleus, $R_3$ represents an alkyl group, and Q represents the group of atoms necessary to complete a 2-thioimidazolidine-2,4-dione nucleus.

13. A photographic sensitive material according to claim 12, wherein a total of from about $1.0 \times 10^{-5}$ to about $1.0 \times 10^{-3}$ moles of one or more sensitizing dyes of general formula (I) is used in combination with from about $1.0 \times 10^{-5}$ to about $1.0 \times 10^{-3}$ moles of one or more sensitizing dyes of general formula (II), both based per mole of silver halide.

14. A photographic sensitive material according to claim 13, wherein the molar ratio of the one or more dyes represented by formula (I)/one or more dyes represented by formula (II) is in the range of from about 10/1 to about 1/10.

* * * * *